(12) United States Patent
Campbell et al.

(10) Patent No.: US 7,120,746 B2
(45) Date of Patent: Oct. 10, 2006

(54) TECHNIQUE FOR DATA TRANSFER

(75) Inventors: John Joseph Campbell, Alton (GB);
David Arlen Elko, Austin, TX (US);
Jeffrey William Josten, San Jose, CA (US); Haakon Philip Roberts, San Jose, CA (US); David Harold Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 10/238,465

(22) Filed: Sep. 9, 2002

(65) Prior Publication Data

US 2004/0049636 A1    Mar. 11, 2004

(51) Int. Cl.
*G06F 12/00* (2006.01)

(52) U.S. Cl. .................... 711/130; 709/203
(58) Field of Classification Search .............. 711/4, 711/112, 113–148, 154, 161–162; 700/200–205; 709/203, 224
See application file for complete search history.

(56) References Cited

U.S. PATENT DOCUMENTS

| | | | |
|---|---|---|---|
| 5,276,835 A * | 1/1994 | Mohan et al. .............. 711/144 |
| 5,317,739 A | 5/1994 | Elko et al. |
| 5,327,556 A * | 7/1994 | Mohan et al. ................. 707/8 |
| 5,331,673 A | 7/1994 | Elko et al. |
| 5,339,405 A | 8/1994 | Elko et al. |
| 5,339,427 A | 8/1994 | Elko et al. |
| 5,392,397 A | 2/1995 | Elko et al. |
| 5,450,590 A | 9/1995 | Elko et al. |
| 5,457,793 A | 10/1995 | Elko et al. |
| 5,463,736 A | 10/1995 | Elko et al. |
| 5,465,359 A | 11/1995 | Allen et al. |
| 5,493,668 A * | 2/1996 | Elko et al. ................... 711/130 |
| 5,515,499 A | 5/1996 | Allen et al. |
| 5,537,574 A | 7/1996 | Elko et al. |
| 5,561,809 A | 10/1996 | Elko et al. |
| 5,574,902 A * | 11/1996 | Josten et al. ................... 707/1 |
| 5,574,945 A | 11/1996 | Elko et al. |
| 5,581,737 A | 12/1996 | Dahlen et al. |
| 5,604,863 A | 2/1997 | Allen et al. |
| 5,630,050 A | 5/1997 | Neuhard et al. |
| 5,634,072 A | 5/1997 | Allen et al. |
| 5,664,155 A | 9/1997 | Elko et al. |
| 5,706,432 A | 1/1998 | Elko et al. |
| 5,737,600 A | 4/1998 | Geiner et al. |
| 5,742,830 A | 4/1998 | Elko et al. |
| 5,761,739 A | 6/1998 | Elko et al. |
| 5,799,183 A * | 8/1998 | Iwashita ........................ 707/2 |

(Continued)

OTHER PUBLICATIONS

Ming-Ling et al., Feb. 26-Mar. 1, 1996, pp. 422-429.*

(Continued)

*Primary Examiner*—Donald Sparks
*Assistant Examiner*—Hashem Farrokh
(74) *Attorney, Agent, or Firm*—David W. Victor; Konrad Raynes & Victor LLP

(57) ABSTRACT

Disclosed is a system, method, and program for transferring data. When a transaction commits, multiple data objects that have been changed by the transaction are identified. The multiple data objects are written from local storage to a cache structure using a batch write command. When changed data objects at a first system that are not cached in the shared external storage are written to disk, a batch cross invalidation command is used to invalidate the data objects at a second system. Additionally, multiple data objects are read from the cache structure into a processor storage using a batch castout command.

33 Claims, 9 Drawing Sheets

U.S. PATENT DOCUMENTS

| | | |
|---|---|---|
| 5,860,115 A | 1/1999 | Neuhard et al. |
| 5,887,135 A | 3/1999 | Dahlen et al. |
| 5,923,890 A | 7/1999 | Kubala et al. |
| 5,948,060 A | 9/1999 | Gregg et al. |
| 5,974,457 A * | 10/1999 | Waclawsky et al. ........ 709/224 |
| 6,092,125 A * | 7/2000 | Schindler ..................... 710/35 |
| 6,178,421 B1 | 1/2001 | Dahlen et al. |
| 6,230,243 B1 | 5/2001 | Elko et al. |
| 6,233,644 B1 | 5/2001 | Dahlen et al. |
| 6,266,783 B1 | 7/2001 | Allen et al. |
| 6,317,744 B1 | 11/2001 | Elko et al. |
| 6,438,654 B1 | 8/2002 | Elko et al. |
| 2002/0116582 A1* | 8/2002 | Copeland et al. ........... 711/133 |
| 2003/0093645 A1* | 5/2003 | Wong et al. ................. 711/216 |

OTHER PUBLICATIONS

Josten, JW, et al. "DBS's Use of the Coupling Facility for Data Sharing," by JW Josten, C Mohan, I Narang and JZ Teng. IBM Systems Journal, vol. 3, No. 2, 1997, S/390 parallel Sysplex Clusters. [online] [retrieved on Aug. 25, 2002]. Retrieved from http://researchweb.watson.ibm.com/journal/sj/362/jostref.html.

* cited by examiner

FIG. 1B

| State 124 | | | |
|---|---|---|---|
| Data Status 170 | User Register Array 172 | User Data Field 174 | ... 176 |
| | | | |

FIG. 1C

| User Register Array 172 | | |
|---|---|---|
| LCID 182 | LCEN 184 | LVI 186 |
| | | |

TECHNIQUE FOR DATA TRANSFER

CROSS-REFERENCE TO RELATED APPLICATIONS

The following co-pending and commonly owned patent applications are incorporated by reference herein in their entirety:

"MEANS FOR COPYING CACHE STRUCTURES BETWEEN TWO COUPLING FACILITIES", Allen et al., application Ser. No. 09/378,839, filed on Aug. 23, 1999.

"TEST TOOL AND METHOD FOR FACILITATING TESTING OF DUPLEXED COMPUTER FUNCTIONS", Jones et al., application Ser. No. 09/968,420, filed on Oct. 1, 2001;

"SYNCHRONIZING PROCESSING OF COMMANDS INVOKED AGAINST DUPLEXED COUPLING FACILITY STRUCTURES", Elko et al., application Ser. No. 09/968,179, filed on Oct. 1, 2001;

"DYNAMICALLY DETERMINING WHETHER TO PROCESS REQUESTS SYNCHRONOUSLY OR ASYNCHRONOUSLY", Jordan et al., application Ser. No. 09/968,185, filed on Oct. 1, 2001;

"MANAGING THE STATE OF COUPLING FACILITY STRUTURES", Elko et al., application Ser. No. 09/968,248, filed on Oct. 1, 2001;

"COUPLING OF A PLURALITY OF COUPLING FACILITIES USING PEER LINKS", Brooks et al., application Ser. No. 09/968,244, filed on Oct. 1, 2001;

"SYSTEM-MANAGED DUPLEXING OF COUPLING FACILITY STRUCTURES", Allen et al., application Ser. No. 09/968,242, filed on Oct. 1, 2001;

"METHOD, SYSTEM AND PROGRAM PRODUCTS FOR PROVIDING USER-MANAGED DUPLEXING OF COUPLING FACILITY CACHE STRUCTURES", Elko et al., application Ser. No. 09/255,382, filed on Feb. 22, 1999;

"METHOD, SYSTEM AND PROGRAM PRODUCTS FOR COPYING COUPLING FACILITY STRUCTURES", Allen et al., application Ser. No. 09/379,054, filed Aug. 23, 1999;

"METHOD, SYSTEM AND PROGRAM PRODUCTS FOR MODIFYING COUPLING FACILITY STRUCTURES", Dahlen et al., application Ser. No. 09/379,435, filed Aug. 23, 1999;

"DIRECTED ALLOCATION OF COUPLING FACILITY STRUCTURES", Dahlen et al., application Ser. No. 09/379,861, filed Aug. 23, 1999;

"METHOD, SYSTEM AND PROGRAM PRODUCTS FOR COPYING COUPLING FACILITY STRUCTURES", Allen et al., application Ser. No. 09/379,053, filed Aug. 23, 1999;

"METHOD OF CONTROLLING THE FLOW OF INFORMATION BETWEEN SENDERS AND RECEIVERS ACROSS LINKS BEING USED AS CHANNELS", Gregg et al., application Ser. No. 09/151,051, Sep. 10, 1998; and "SYSTEM OF CONTROLLING THE FLOW OF INFORMATION BETWEEN SENDERS AND RECEIVERS ACROSS LINKS BEING USED AS CHANNELS", Gregg et al., application Ser. No. 09/150,942, filed Sep. 10, 1998.

BACKGROUND OF THE INVENTION

1. Field of the Invention

The present invention is directed to data transfer in a multi-system environment in which data is shared.

2. Description of the Related Art

In a shared-disk database management system (DBMS), multiple DBMSs (referred to as DBMS members) form a cluster and share storage. Each DBMS member in the cluster has a local buffer pool (BP) in which database pages are cached for fast access. A page may be cached in buffer pools of multiple DBMS members. As pages in the local buffer pool of one DBMS member are changed (i.e., updated), a "buffer coherency" problem results whereby the other DBMS members that have those pages cached must detect that their local copies are now out of date (i.e., "downlevel") and they must obtain the most recent version of the page.

Various techniques have been developed in the prior art for transferring changed pages from one system to another. In the z/OS® environment, a "coupling facility" (CF) provides shared electronic storage and very high speed connectivity and is available from International Business Machines, Inc. A coupling facility is further described in "DB2's use of the Coupling Facility for Data Sharing," Jeffrey W. Josten, IBM Systems Journal, Volume 36, Number 2, 1997, which is incorporated herein by reference.

In z/OS® environments, when multiple pages are changed in a buffer pool of a DBMS member, each changed page is transferred to shared electronic storage by writing one page at a time. That is, the DBMS member issues one "write data" command per changed page. However, with workloads that change a large quantity of pages, the page-at-a-time writes can add a significant amount of Central Processing Unit (CPU) overhead.

Additionally, the coupling facility provides a set of control structures and commands which allow the DBMS members to register their interest in a given page so that when the page is subsequently changed and written to the shared electronic storage, the coupling facility can send cross-invalidation (XI) signals to those DBMS members that have registered their interest in the page. The cross-invalidation signals are sent per page. When a DBMS member that has received the cross-invalidation signal then references that page in its local buffer pool, the DBMS member can quickly detect that the page is now invalid and can refresh the page very quickly from the coupling facility.

Changed data in a cache structure is associated with a castout class. Currently, when data is transferred from a cache structure to storage at each DBMS member 110A . . . N, the transfer is triggered by a time interval or structure full threshold. Then, a determination is made of which castout classes have significant amounts of changed data to be castout. For each of the determined classes, a list of all of the changed entries that are present in the castout class is read. For each entry in the list, entry data is read and the entry is locked for castout. Then, all entries are written to direct access storage devices (DASD) connected to the DBMS members under castout lock serialization for all the entries that were castout.

In environments other than z/OS® (e.g., Unix®, Windows®, or Linux® environments), changed pages are typically transferred from one member in a cluster of processors to another member either via disk input/output (I/O) or via point-to-point inter-system communication links. Some modem disk controllers come equipped with large electronic storage caches and a significant amount of central processing unit (CPU) power, and can transfer one or more pages at a time.

InfiniBand is an architecture and specification for data flow between processors and I/O devices that offers throughput of up to 2.5 gigabytes per second and support for up to 64,000 addressable devices. Infiniband is expected to offer better sharing of data between clustered processors. Infiniband, however, does not address the buffer coherency problem.

Thus, there is a need in the art for improved data transfer and for efficient buffer coherency between systems that are sharing data.

SUMMARY OF THE INVENTION

Provided are a method, system, and program for transferring data. Multiple data objects that have been changed by one or more transactions are identified. The multiple data objects are transferred from local storage to a shared cache structure using a batch write command.

In certain implementations, a method, system, and program for transferring data are provided in which, when changed data objects at a first system that are not cached in shared cache are transferred to disk, sending a batch cross invalidation command identifying the changed data objects transferred to disk.

In certain implementations, a method, system, and program for transferring data are provided in which multiple data objects are transferred from a cache structure to a processor storage using a single batch castout command. Then, the multiple data objects are transferred from the processor storage to disk.

The described implementations of the invention provide a method, system, and program for transferring data. By batching together high-frequency cache structure operations, implementations of the invention reduce the number of commands sent to shared external storage, and thereby improve the performance (e.g., host CPU overhead and elapsed time) associated with writing data to shared external storage, casting out data from the shared external storage, and cross-invalidating data, when high-update activity workloads are executing.

BRIEF DESCRIPTION OF THE DRAWINGS

Referring now to the drawings in which like reference numbers represent corresponding parts throughout:

FIG. 1B illustrates, in a block diagram, further details of a state field in accordance with certain implementations of the invention.

FIG. 1C illustrates, in a block diagram, further details of a user register array in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
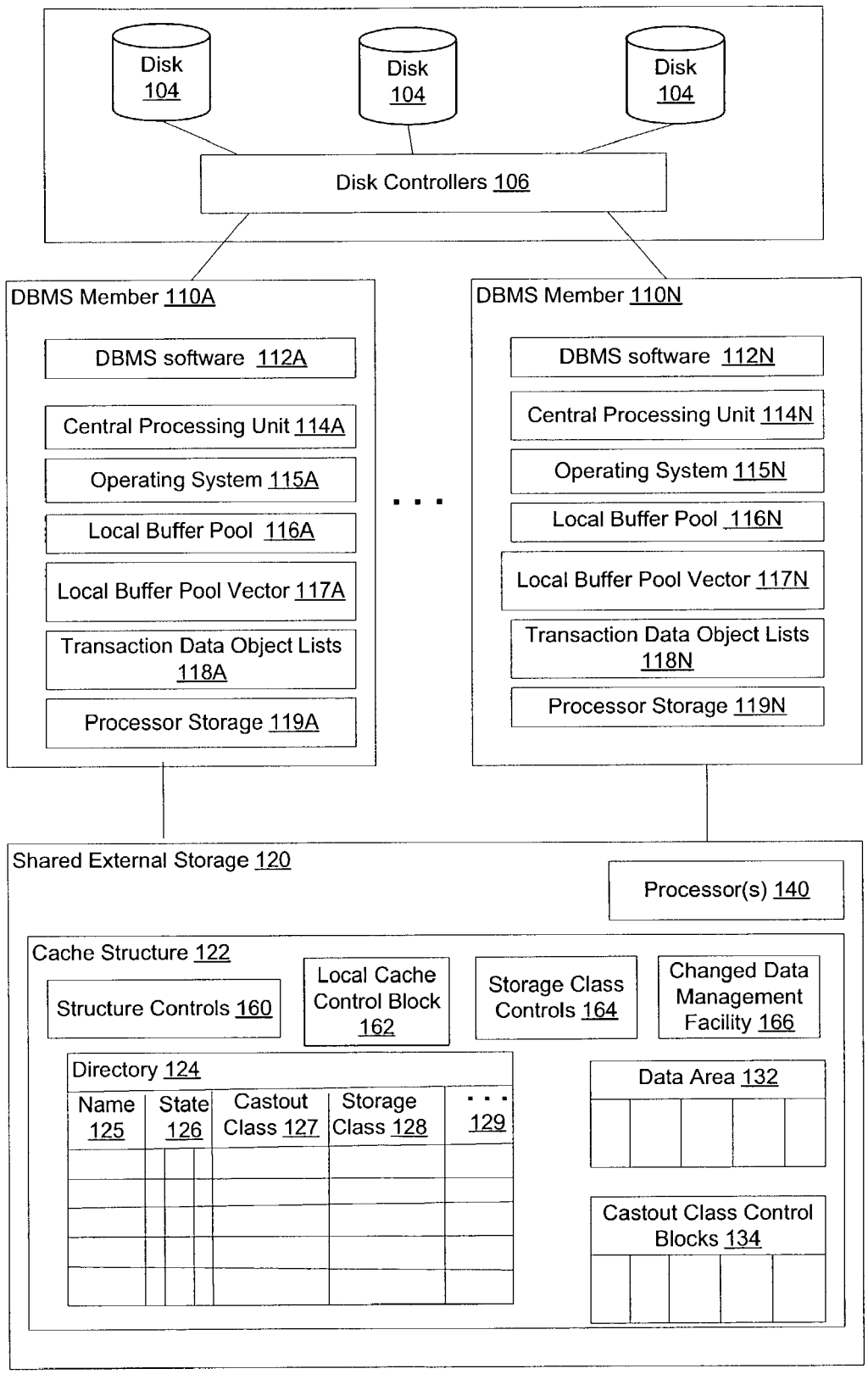
FIG. 1A illustrates, in a block diagram, a computer architecture in accordance with certain implementations of the invention.

FIG. 1A illustrates, in a block diagram, a computer architecture in accordance with certain implementations of the invention. In the figures, for ease of reference, multiple copies of elements in an illustration will be referred to with the same reference number and a character (e.g., 110A to 110N, wherein N indicates an nth copy of the element). For example, multiple DBMS members will be referred to as DBMS members 110A . . . N. Additionally, certain variables, such as N are used to denote integer values indicating a certain number of elements. These variables may denote any number when used at different instances with the same or different elements.

DBMS members 110A . . . N are connected to a shared external storage 120. In certain implementations, the shared external storage 120 is a coupling facility available from International Business Machines, Inc. Each DBMS member 110A . . . 110N has DBMS software 112A . . . N, a central processing unit 114A . . . N, operating system 115A . . . N, local storage (e.g., local buffer pools 116A . . . N), a local buffer pool vector 117A . . . 117N, transaction data object lists 118A . . . N, and processor storage 119A . . . N. In certain implementations, "private buffers" are reserved for the purposes of castout and are not used for database caching, and this is done to ensure that castout does not interfere with the normal database caching operations in the local buffer pools 116A . . . N.

The DBMS software 112A . . . N owns and controls a set of resources within the computer system. As one example, the DBMS software may be DB2®, offered by International Business Machines Corporation.

Each central processing unit 114A . . . N executes an operating system 115A . . . N, such as the z/OS® operating system offered by International Business Machines Corporation, which is used for controlling execution of programs and the processing of data.

Local buffer pools 116A . . . N store data (e.g., data objects such as pages) for respective DBMS members 110A . . . 110N. The local buffer pools 116A . . . N include a user allocated and managed storage area on the local system. The DBMS member 110A . . . 110N registers interest with the shared external storage 120 to indicate interest in obtaining cross-invalidation signals for data changed at other DBMS members 110A . . . 110N. Registration of interest correlates a named data object to an index in the local buffer pool vector 117A . . . 117N such that the index reflects the validity of the named data object in the local buffer pool 116A . . . N. Each local buffer pool 116A . . . N may include, for example, a name field for referencing data; a data field for storing the data; and an optional adjunct data field for additional data.

The DBMS members 110A . . . 110N may access one or more disks 104 (e.g., direct access storage devices (DASD)) via one or more disk controllers 106.

The DBMS members 110A . . . 110N may be connected to the shared external storage 120 via, for example, shared external storage 120 channels and high speed fiber optic links.

The shared external storage 120 includes storage, such as cache structure 122, accessible by the DBMS members 110A . . . N and includes one or more processors 140 for performing operations requested by application programs (e.g., DBMS software 112A . . . 112N) in the DBMS members 110A . . . N. The cache structure 122 and/or the shared external storage 120 may include other or additional components or information. In FIG. 1A the cache structure 122 includes a directory 124, data area 132, castout class control blocks 134, user register 172, structure controls 160, local cache control block 162, storage class controls 164, and changed data management facility, which are described in further detail in U.S. Pat. No. 6,317,744 B1, issued on Nov. 13, 2001 to David A. Elko et al., and which is incorporated by reference herein in its entirety.

The cache structure 122 is partitioned into a set of directory entries in directory 124 and a set of data entries in data area 132. In certain implementations, the numbers of each type of entry in directory 124 and data area 132 are determined when the cache structure 122 is allocated via, for example, programming interface parameters that indicate the desired partitioning of the cache structure 122.

A cache structure 122 supports the partitioning of named data items according to storage classes. Every named data object identified to the cache structure 122 resides in a connection specified storage class. The directory entries in directory 124 are partitioned into storage classes and arranged as a fully associative array. A subset of changed directory entries is additionally partitioned into castout classes.

Each directory entry in directory 124 includes, for instance, a name field 125, a state field 126, a castout class field 127, a storage class construct 128, and may include additional information represented by the ellipses 129.

Whenever a named data object is placed in shared external storage 120 cache structure 122 or local buffer pools 116A . . . N, the name of the named data object is registered in a name field 125 and its state is registered in state field column 126 in the directory 124. The state information indicates, for example, whether data is changed, unchanged, locked for castout or resident in the shared external storage 120.

FIG. 1B illustrates, in a block diagram, further details of the state field 126 in accordance with certain implementations of the invention. In particular, the state field 126 includes a data status field 170, a user register array 172, a user data field 174, and may include other fields represented by ellipses 176.

FIG. 1C illustrates, in a block diagram, further details of the user register array 172 in accordance with certain implementations of the invention. The user register 172 is an array which contains an entry for each DBMS user of the cache structure. Within each user's entry in the user register, the shared external storage 120 keeps track of whether or not that user has a valid local copy of the named entry in their local buffer pool 116A . . . N, and if so, the shared external storage 120 keeps track of the vector index into the user's local buffer pool vector 117A . . . N with which that user's local copy has been correlated. This is the local buffer pool vector index that is cross-invalidated when necessary, for each of the valid users in the user register. For example, user register 172 includes a local cache identifier (LCID) 182, a local-cache-entry number (LCEN) 184, and a valid bit (LVI) 186 for the local-cache-entry number. A valid local-cache-entry number is registered in the local-cache register when a registration process is executed for the specified name and local cache. A local-cache-entry number is invalidated when a local cache is detached, or when a batch cross invalidation process is executed for the specified name and the local cache is a member of the set of local caches being invalidated. The LCEN field 184 is invalid when the LVI field 186 is zero.

The state also includes a user data field (UDF) 174 (FIG. 1B), which contains a value that is associated with the data when it is initially changed in the shared external storage 120 cache and is maintained until the data area is reused. The user data field 174 is valid when the data is cached as changed. The user data field 174 contains a time value or timestamp, which represents the oldest point in time when the data element was changed and that change has not yet been migrated to disk 104.

Data entries in data area 132 contain cached subsystem data. In certain implementations, data entries include zero or more elements. Each data entry has a corresponding directory entry that contains control information. Directory entries may exist without an associated data entry.

Directory entries contain control information that identifies named subsystem data objects to the structure, describes the attributes of subsystem data objects, permits registration of connection interest in data, facilitates the casting out of data, and affects structure resource management operations. A directory entry is always allocated for and associated with a data entry that contains cached subsystem data. A directory entry may be allocated and useful without an associated data entry by permitting the definition of named subsystem data objects and registration of connection interest in such items prior to, and perhaps even without, actually caching the data in the structure.

Cache structure 122 operations that cause the contents or state of a data entry to change result in the invalidation of local copies via the local buffer pool vectors 117A . . . 117N. Cached data may be in either the changed or unchanged state. In certain implementations, if cached data is changed, the version of the data in the cache structure 122 supercedes any version on another medium. Cast-out operations from the cache structure 122 may be performed for changed data. In certain implementations, serialization mechanisms ensure that multiple DBMS members 110A . . . N do not perform concurrent cast-out of a given data object. All changed data objects in the cache structure 122 are assigned to a cast-out class.

Data area 132 is the area in the cache in which the user data is stored. A data object cached in the shared cache is identified by a software-assigned name. Therefore, any request for reading or writing data in the shared cache specifies the name of the data object, which is the object of the request. The directory is conventionally indexed by the names of the data objects, which are objects of the read or write commands.

Castout class control blocks 134 include a castout class control block for each castout class associated with the cache structure. In accordance with the principles of the present invention, each castout class control block has pointers to a data structure of directory entries corresponding to the changed data elements of that castout class.

When accessing a data object (e.g., to change the data object), a DBMS member 110A . . . 110N attempts to read the data object from the local buffer pool 116A . . . 116N. The DBMS member 110A . . . 110N determines whether the data is in the local buffer pool 116A . . . N and is valid using the local buffer pool vector 117A . . . 117N. If the data is in the local buffer pool 116A . . . 116N, and has not been invalidated, the data object is available and no read is required. If the data object has been invalidated, the DBMS member 110A . . . 110N attempts to read the data object from the cache structure 122 of the shared external storage 120. The shared external storage 120 determines whether the data object is available in the cache structure 122. If the data object is in the cache structure 122, the shared external storage 120 returns the data object to the DBMS member 110A . . . 110N. If the data object is not in the cache structure 120, the DBMS member reads the data object from disk 104.

Implementations of the invention enable more efficient data transfer. In particular, the DBMS members 110A . . . N write multiple data objects from local buffer pools 116A . . . N to cache structure 122 with a single command, which for ease of reference will be referred to herein as a "batch write command." Additionally, the DBMS members 110A . . . N cast out multiple data objects from cache structure 122 to disk 104 with a set of commands that include a single command for bringing data into processor storage 119A . . . N from cache structure 122, which for ease of reference will be referred to herein as a "batch castout command." For the castout process, another command is issued to write the data objects from processor storage 119A . . . N to disk 104, and this is a separate I/O process. Furthermore, each DBMS member 110A . . . N issues a single cross-invalidation command to invalidate multiple data objects in local buffer pools 116A . . . N of other DBMS members 110A . . . N, which for ease of reference will be referred to herein as a "batch cross-invalidation command."

Figure 2A:
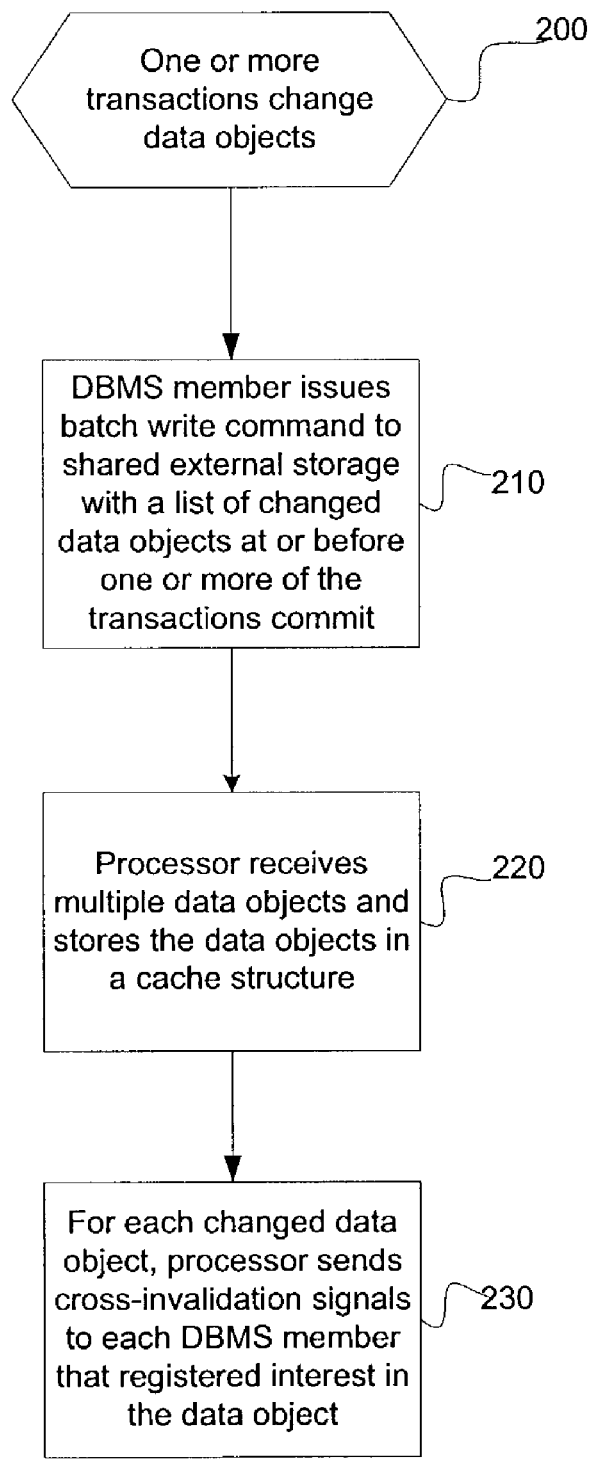
FIG. 2A illustrates logic implemented to use a batch write command in accordance with certain implementations of the invention.

FIG. 2A illustrates logic implemented to use a batch write command in accordance with certain implementations of the invention. Control begins at block 200 with one or more transactions changing data objects in the local buffer pool 116A . . . 116N of one of the DBMS members 110A . . . 110N. At or before commit of the one or more transactions, in block 210, the DBMS member 110A . . . 110N issues a batch write command to the shared external storage 120 with a list of changed data objects. The changed data objects are to be written to the shared external storage 120 for access by the other DBMS members 110A . . . 110N. The batch write command specifies a transaction data object list that identifies changed data objects. In certain implementations, once the batch write command is sent, the operating system 115A . . . N executing on the central processing unit 114A . . . 114N sends the data objects identified on the transaction data object list to the shared external storage 120.

In certain implementations, the DBMS member 110A . . . 110N accomplishes the multiple data object write by using a transaction data object list (e.g., a transaction page list or TPL) 118A . . . 118N. The transaction data object list keeps track of all of the changed data objects for a given transaction. At or before the transaction commit, instead of processing one transaction data object list entry at a time to write the changed data objects, multiple transaction data object list entries (where each transaction data object list entry corresponds to a changed data object) are submitted with the batch write command to write all of these data objects in a single command, thus achieving better performance than page-at-a-time writes.

In certain implementations, the first "M" number of data object list entries are used to identify multiple data objects to be written (where M may be 1 to any higher number). In certain implementations, 256 data object list entries may be written if no data objects are associated with them or fewer data object list entries may be written if one or more of the entries have data objects associated with them. In certain implementations, M=15 pages, and each page is 4096 bytes in size, and the total amount of data transfer on a command is limited to 64 K bytes, including the controls that designate the entries to be written and also the data objects associated with those entries.

The processor 140 receives and processes the batch write command to store the multiple data objects in the cache structure 122 (block 220). In particular, the processor 140 receives multiple data objects that had been stored in the local buffer pool 116A . . . N and finds space for the data objects in the cache structure 122. For each changed data object, the processor 140 sends a cross-invalidation command to each DBMS member 110A . . . 110N that registered interest in the data object (block 230). In certain implementations, hardware at the DBMS members 110A . . . 110N functions to set bits in the local buffer pool vector 117A . . . N in response to the cross-invalidation signal. Thus, improved performance is achieved by writing multiple data objects from local buffer pools 116A . . . N to cache structure 122 with the batch write command.

Figure 2B:
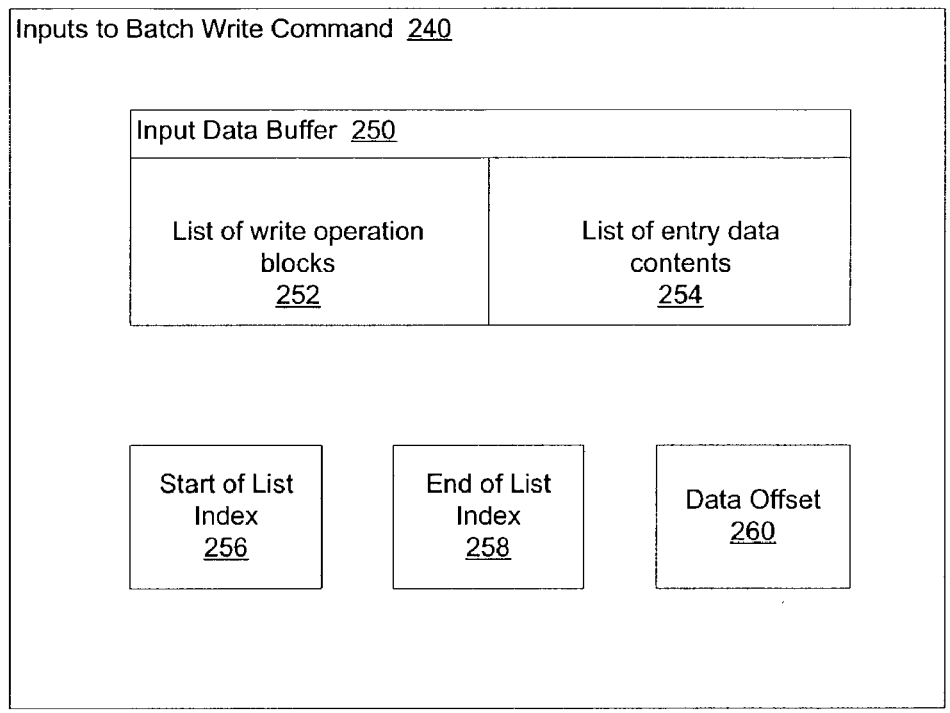
FIG. 2B illustrates the inputs and outputs of a batch write command in accordance with certain implementations of the invention.
Figure 2B:
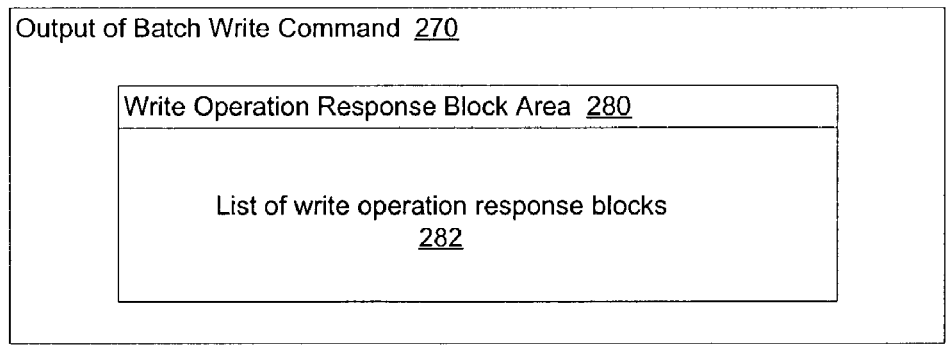

FIG. 2B illustrates the inputs 240 and outputs 270 of the batch write command in accordance with certain implementations of the invention. In certain implementations, the batch write command takes as input 240 an input data buffer 250 that is partitioned into two parts. A first part is a list of write operation blocks 252 (WOBs) (e.g., up to 256) and that describe each entry to be written. The description of each entry includes, for example, an entry name, storage and castout class information, a changed/unchanged indicator, local buffer registration information, and an adjunct area. The second part is a list of entry data contents 254 to be written to the designated entries. The input will also contain a start of list index 256 and an end of list index 258 that will contain the index of the WOB in the input data block that processing should start with and the index of the WOB in the input data block that the processing should end with. Moreover, the input 240 contains a data offset 260, which will contain the offset of the first data area in the input data block. The output 270 includes a Write Operation Response Block Area (WORBAREA) 280 that will contain a list of Write Operation Response Blocks (WORBs) 282 for each WOB that is returned and that indicates the outcome of each write.

In certain implementations, if all the entries in the WOB cannot be processed, then the batch write command may timeout and be redriven by the DBMS. When the command completes with a "timeout" response code, the current index and the current data offset outputs are set to the values that indicate the "next" (first unprocessed) entry in the list of WOBs and the list of data entry contents. The outputs for a timeout response may include response code, current index, and current data offset. The DBMS can pass these output values back in as input on the next batch write command (start of list index, data offset) to continue the processing of the list from where it left off. Furthermore, the batch write command may encounter errors in processing a particular entry in the list. In such case, the batch write command may be designed to (if necessary) stop processing prematurely with an error response code, indicating the specific error, and using the current index and current data offset output values to tell the DBMS the entry and data area in the list where the error occurred. In this way, the DBMS may handle the error that was encountered in processing the specific entry in the list by continuing to process the list starting with the entry after the one where the error occurred. The response codes associated with the batch write command may include: Processing complete (success); Model-dependent timeout occurred (timeout); incompatible state (error); Target Storage class full (error); Version number mismatch (error); Assignment suppressed (error); Data area size mismatch (error); Invalid local-cache identifier (error); Invalid data-area size (error); Invalid storage class (error); Invalid castout class (error); and Invalid castout-parity bits (error).

In certain implementations of the invention, the multi-system data sharing overhead for heavy batch insert workloads is reduced by 57% in cases in which data objects are written to the shared external storage 120 using the batch write command.

For example, it is possible, that a transaction of a banking application is changing a record for each account holder in local buffer pool 116A for DBMS member 110A. There may be one million records, across 500,000 pages, to be changed. Once the transaction commits, the changed pages are written to the shared external storag 120 cache structure 122 from the local buffer pool 116A using a batch write command.

For the "force at commit" buffer write protocol (which is used by DB2® for z/OS®), the changed data objects are written at or before commit, before the transaction releases its locks. That is, the DBMS members 110A . . . N can write the changed data objects asynchronously to the execution of the transaction. Also, when a data object is written, the data object may contain changes from multiple transactions. The asynchronous writes can be triggered by events such as local buffer pool thresholds or a system checkpoint. In fact, when transactions change many data objects in a single commit scope, it is likely that the majority of the data objects will be written asynchronously, and only a few of the data objects will need to be written at commit time. The batch write command may be used by the DBMS in both the asynchronous (i.e., data objects written in the background due to thresholds or a system checkpoint) and the synchronous (i.e., data objects written at commit time) cases. This results in improved performance due to reduced CPU overhead on the host system.

There is another buffer write protocol called "no force." With the "no force" protocol, the changed data objects do not need to be written by commit time, but the changed data objects can remain in the local buffer pool 116A . . . N in a "dirty" (i.e., changed) state after commit, and the data objects are protected by a "lazy lock" (i.e., a lock that is held on a changed buffer past commit, so the lock is not owned by the transaction but is owned by the DBMS member 110A . . . N) on the data object. For "no force," the writing of the buffers is done almost entirely asynchronously to the execution of the transaction. But as with the "force at commit" protocol, the "no force" protocol eventually writes the data objects (e.g. when another DBMS member 110A . . . N wants to change the data object), and so the batch write command is also applicable to the "no force" protocol. The batch write command is a more efficient technique of transferring changed data objects while maintain buffer coherency for shared-disk DBMS environments, regardless of "force at commit" or "no force" protocols.

In certain implementations, heuristics (e.g., CPU cost) are used to determine when it is more efficient to use the batch write command versus page-at-a-time write commands (i.e., several single write commands). The techniques of the invention are applicable to both simplex and duplexed shared external storage 120 structures. With a simplex structure, a redundant duplex copy of the data is not provided. With a duplexed structure, a redundant duplex copy of data is provided.

Figure 3A:
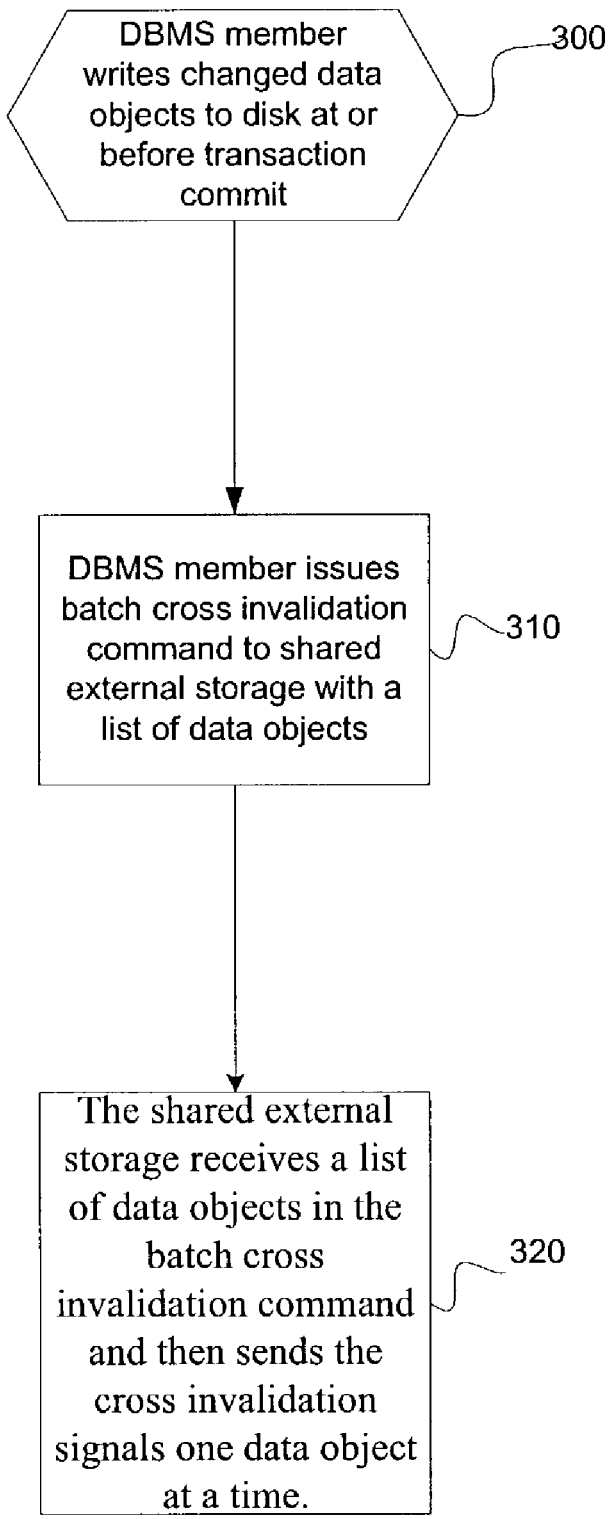
FIG. 3A illustrates logic implemented to use a batch cross invalidation command in accordance with certain implementations of the invention.

FIG. 3A illustrates logic to use a batch cross invalidation command in accordance with certain implementations of the invention. The DBMS members 110A . . . N use the batch cross invalidation command to efficiently cross-invalidate changed data objects that are not cached in the shared external storage 120, and thus, which are not written out to the shared external storage 120 at transaction commit using the batch write command. When the shared external storage 120 processes a batch write command or a batch cross invalidation command, a single shared external storage 120 command is used to send many cross invalidation requests from DBMS members 110A . . . N to the shared external storage 120. However, the shared external storage 120 will actually perform the local buffer pool vector 117A . . . N cross invalidations of all necessary DBMS members' 110A . . . N local cache vector entries that result from this processing one at a time. The shared external storage 120 already has support for parallelism in sending these cross invalidation signals, however, in certain implementations, they are not batched.

The batch cross invalidation command is used by the DBMS members 110A . . . N when the changed data objects are written directly to disk, and the shared external storage 120 is used only for buffer invalidation. DB2® for z/OS® has an option called 'GBPCACHE' to allow users to control this. Today when the GBPCACHE option is used with NO as an input parameter (i.e., "GBPCACHE NO"), data is not cached and DBMS members 110A . . . N writes the changed data objects to disk 104 at or before commit (block 300). After the data objects are written, DBMS members 110A . . . N issues a cross invalidation request to the shared external storage 120 with a list of data objects to send cross invalidation signals for each of the data objects (block 310). With the batch cross invalidation command, DBMS members 110A . . . N can now issue one shared external storage 120 command to send cross invalidation signals for multiple data objects. The shared external storage 120 receives a list of data objects from the batch cross invalidation command and then sends the cross invalidation signals one data object at a time (block 320).

The batch cross invalidation command, like the batch write and batch castout commands, allows for better performance by saving host CPU cycles since it is more efficient for the host to send one shared external storage 120 command for multiple data objects rather than one command for each data object. In certain implementations of the invention, overhead is reduced by 37% in cases in which database data objects are not cached in the shared external storage 120.

Figure 3B:
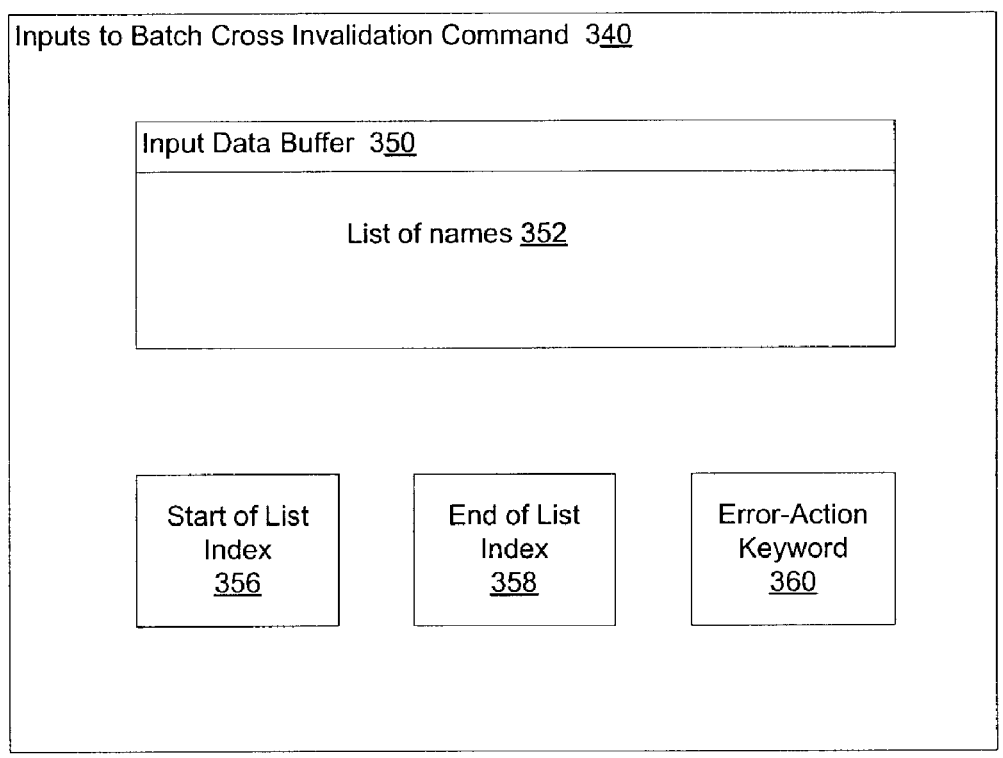
FIG. 3B illustrates the inputs and outputs of a batch cross invalidation command in accordance with certain implementations of the invention.

FIG. 3B illustrates the inputs 340 of a batch cross invalidation command in accordance with certain implementations of the invention. In certain implementations, the batch cross invalidation command takes as input 340 a data buffer 350 that includes a list of names 352 (e.g., up to 4096) to be processed. The input will also contain a start of list index 356 an end of list index 358 that will contain the index of the entry name in the input data block that processing should start with and the index of the entry name in the input data block that the processing should end with. The input may also contain an error-action keyword 360 that will specify whether processing is to continue to the next name in the input data block if an entry is not found. In certain implementations, there is no output for the batch cross invalidation command.

In certain cases, the "batch cross invalidate" command may not be able to process the entire list of names in a single request. To handle such situations, the "batch cross invalidate" command may be designed to (if necessary) time out and be redriven by the DBMS, starting where it left off on the previous iteration. To implement this timeout handling, the batch cross invalidate command may produce the following outputs, response code and current index. When the batch cross invalidate command completes with a "timeout" response code, the current index output is set to the value that indicates the "next" (first unprocessed) entry in the list of names. The DBMS can pass this output value back in as input on the next command (start of list index) to continue the processing of the list from where it left off.

Furthermore, the batch cross invalidate command may encounter errors in processing a particular entry in the list. To handle such errors, the batch cross invalidate command may be designed to (if necessary) stop processing prematurely with an error response code, indicating the specific error, and using the current index to tell the DBMS the entry in the list where the error occurred in order to allow the DBMS to handle the error that was encountered in processing the specific entry in the list, and then continue processing the list starting with the entry after the one where the error occurred. The response codes associated with the batch cross invalidate command may include: Processing complete (success); Model-dependent timeout occurred (timeout); and Name not found (error).

Figure 4A:
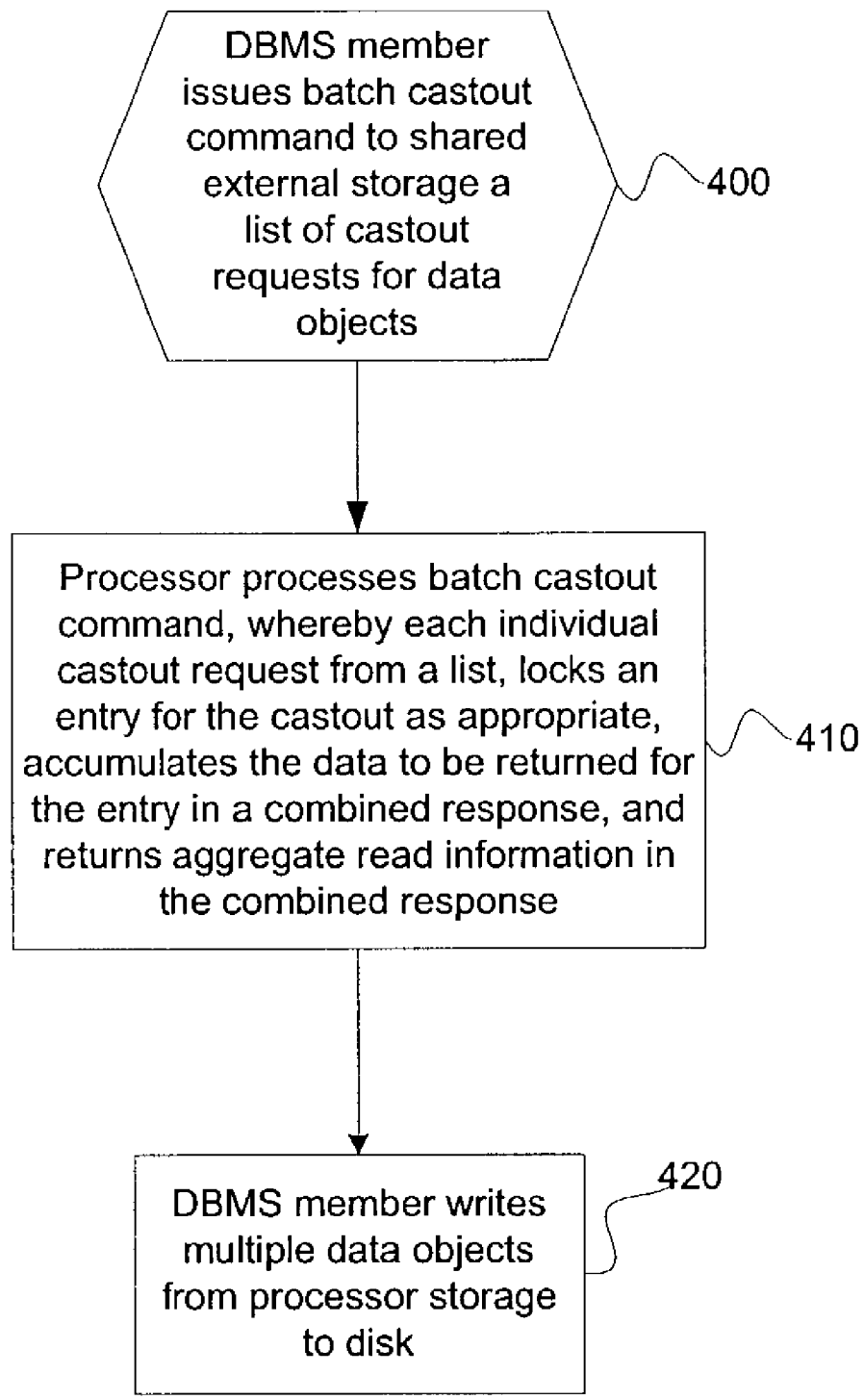
FIG. 4A illustrates logic implemented to use a batch castout command in accordance with certain implementations of the invention.

FIG. 4A illustrates logic implemented to use a batch castout command in accordance with certain implementations of the invention. Control begins in block 400 with the DBMS member 110A . . . 110N issuing a batch castout command to the shared external storage 120 with a list of castout requests for data objects to be read from cache structure 122. In certain implementations, a castout (CO) indicator (which is also referred to as a castout lock) is set in the shared external storage 120 for each of the data objects to be cast out to prevent more than one DBMS member 110A . . . 110N from attempting to castout the same data object. The cast out data objects may still be accessed for reads or writes. The processor 140 processes the batch castout command (block 410). In particular, processing of the batch castout command results in each individual castout request from the list, locks an entry for the castout as appropriate, accumulates the data to be returned for the entry in a combined response, and returns aggregate read information in the combined response. Thus, multiple data objects are returned from the cache structure 122 to the processor storage 119A . . . 119N. In block 420, the DBMS member 110A . . . 110N writes the data objects from processor storage 119A . . . 119N to disk 104. When the castout lock is set, the DBMS member 110A . . . 110N releases the castout lock. In certain implementations, the castout locks are released with an Unlock Castout Locks command (available from International Business Machines, Inc.) that is batched.

Figure 4B:
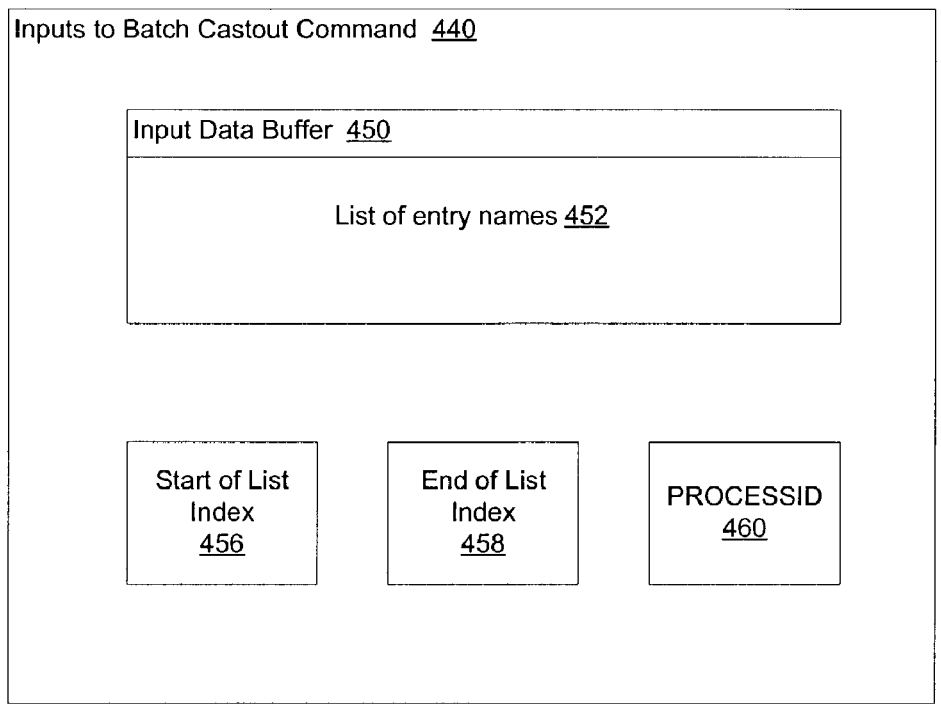
FIG. 4B illustrates the inputs and outputs of a batch castout command in accordance with certain implementations of the invention.
Figure 4B:
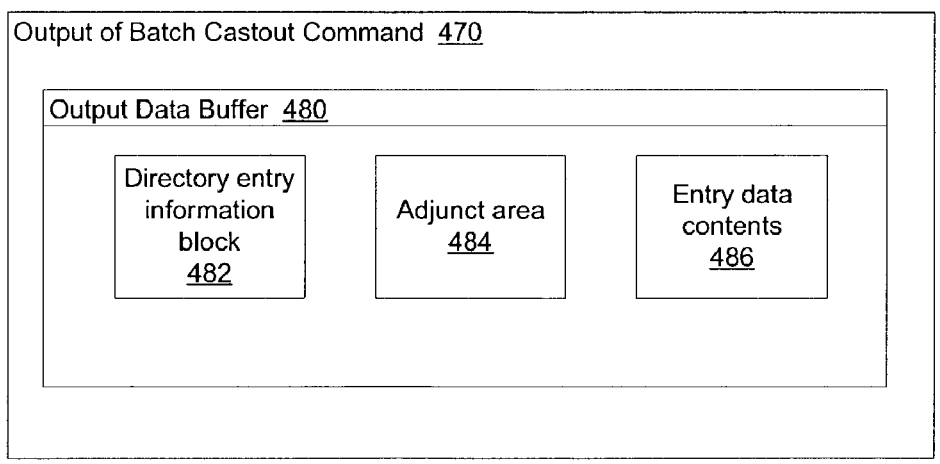

FIG. 4B illustrates the inputs 440 and outputs 470 of a batch castout command in accordance with certain implementations of the invention. In certain implementations, the batch castout command takes as input 440 an input data buffer 450 containing a list of entry names 452 (e.g., up to 8), specified by a CASTOUTLIST, to be read for castout. The input will also contain a start of list index 456 and an end of list index 458 that will contain the index of the entry name in the input data block that processing should start with and the index of the entry name in the input data block that the processing should end with. Optionally, a PROCESSID 460 can be specified to be placed in the cast-out locks along with the connection identifier for the cast-out locks obtained on the request. Also, the output 470 includes an output data buffer 480 that contains information read for each entry in the list. In particular, the output data buffer 480 includes one or more instances (only one is shown) of a directory entry information block 482 (DEIB) with entry controls, an adjunct area 484 (if present), and entry data contents 486 that will contain the data read for each entry in the input list 452.

In certain cases, the batch castout command may not be able to process the entire list of names in a single CF batch castout request. To handle such errors, the batch castout command may be designed to (if necessary) time out and be redriven by the DBMS, starting where the command left off on the previous iteration. To implement this, the command outputs may include a response code and current index. When the batch castout command completes with a "timeout" response code, the current index output is set to the value that indicates the "next" (first unprocessed) entry in the list of names. The DBMS can pass this output value back in as input on the next batch castout command (start of list index) to continue the processing of the list from where the command ended. Furthermore, the batch castout command may encounter errors in processing a particular entry in the list. To handle such errors, the batch castout command may be designed to (if necessary) stop processing prematurely with an error response code, indicating the specific error, and using the current index to tell the DBMS the entry in the list where the error occurred in order to allow the DBMS to handle the error that was encountered in processing the specific entry in the list, and then continue processing the list starting with the entry after the one that hit the error. The batch castout command may be associated with the following response codes: Processing complete (success); Model-dependent timeout occurred (timeout); Data not changed (error); Name not listed in directory (error); Data already locked for castout (error); Data block full (error); Insufficient data block (error); and Insufficient message buffer space (error).

In certain implementations, castout is scheduled based on changed-data object thresholds, such as a castout class threshold or a cache structure threshold. Castout scheduling is described further in "DB2's use of the Coupling Facility for Data Sharing," Jeffrey W. Josten, IBM Systems Journal, Volume 36, Number 2, 1997, which is incorporated herein by reference.

Thus, in certain implementations of the invention, a shared external storage 120 command that allows for the writing of multiple database data objects in a single command are used. When a transaction changes multiple data objects belonging to the same object, the multi-system data sharing overhead is reduced by using a single batch write command to write multiple data objects to the shared external storage 120 (instead of using a single write command per data object). In certain implementations, the batch write command is a Write And Register Multiple (WARM) command available in a coupling facility from International Business Machines, Inc.

Also, as data objects are castout from the shared external storage 120 to processor storage 119A . . . N, the DBMS member 110A . . . N castout processing may be performed with less CPU consumption by using the batch castout command to read multiple data objects from the shared external storage 120 into processor storage 119A . . . N with a single command (instead of using a single read command for each data object). In certain implementations, the batch castout command is a Read For CastOut Multiple (RFCOM) available in a coupling facility from International Business Machines, Inc.

In certain implementations, for database objects that are not cached in the shared external storage, certain implementations of the invention incorporate the use of a batch cross-invalidation command to cross-invalidate a list of data objects with a single shared external storage command (instead of using a single cross-invalidate command for each data object). In certain implementations, the batch cross-invalidation command is an Invalidate Complement Copies List (ICCL) command available in a coupling facility from International Business Machines, Inc.

Thus, the CPU overhead of multi-system DBMS data sharing in application scenarios where there is heavy change and/or insert activity against very large databases is reduced. This is especially useful, for example, for banking and telecommunications customer sets.

Certain implementations of the invention manage local buffer pools and a shared memory cache structure 122 to mimic how I/O to disk works, rather than mimicking how local buffer pools work when performing batch writes and batch castout commands. To maintain performance, the cache coherency problem has been solved using very high speed, low latency inter-system communication protocols.

DB2 and z/OS are trademarks of International Business Machines, Inc. Unix is a trademark of The Open Group. Windows is a trademark of Microsoft Corporation. Linux is a trademark of Linus Torvalds.

ADDITIONAL IMPLEMENTATION DETAILS

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 3A, and 4A describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 2A, 3A, and 4A was described as being implemented in software. This logic may be part of the operating system of the host systems or an application program. In yet further implementations, this logic may be maintained in storage areas managed by the control units or in a read only memory or other hardwired type of device. The preferred logic may be implemented in hardware or in programmable and non-programmable gate array logic.

Figure 5:
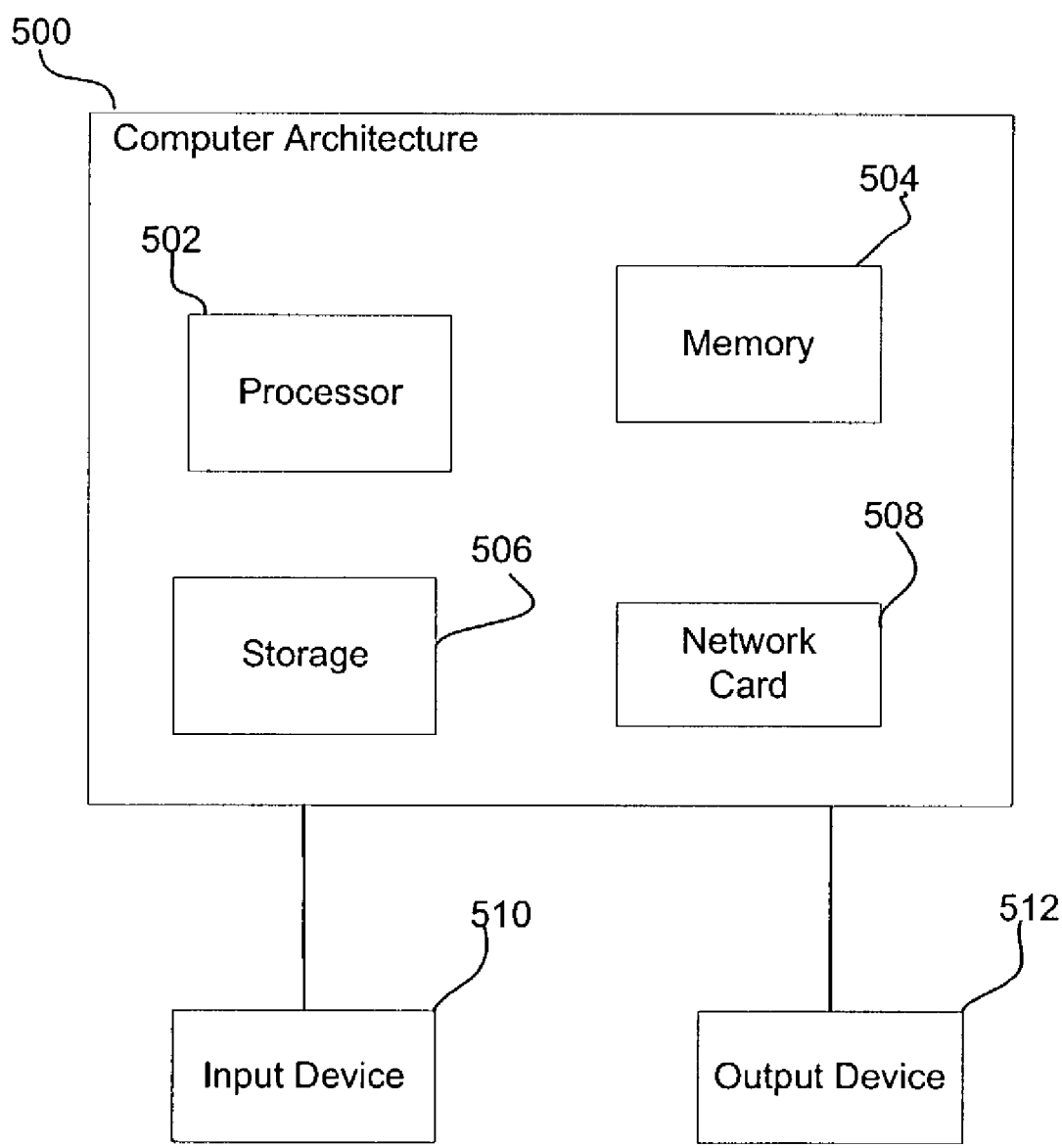
FIG. 5 illustrates one implementation of the architecture of a DBMS member and/or shared external storage.

FIG. 5 illustrates one implementation of the architecture of the DBMS members 110A . . . 110N and/or shared external storage 120. The DBMS members 110A . . . 110N and/or shared external storage 120 a computer architecture 500 having a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for transferring data, comprising:
   identifying multiple data objects that have been changed by one or more transactions;
   using heuristics to determine whether to use a batch write command or several single write commands; and
   transferring the multiple data objects from local storage to a shared cache structure using the determined batch write command or single write commands.

2. The method of claim 1, wherein the multiple data objects are identified using a transaction data object list.

3. The method of claim 1, wherein the batch write command is used with a "no force" protocol.

4. A method for transferring data, comprising:
   identifying multiple data objects that have been changed by one or more transactions; and
   transferring the multiple data objects from local storage to a shared cache structure using a batch write command with a "force at commit" protocol.

5. A method for transferring data, comprising:
   identifying multiple data objects that have been changed by one or more transactions; and
   transferring the multiple data objects from local storage to a shared cache structure using a batch write command, wherein the batch write command takes as input an input data buffer comprising a list of write-operation blocks that describe entries to be written, a list of entry data contents to be written, a start of list index, an end of list index, and a data offset and returns as output a list of write operation response blocks for each write operation block that indicates the outcome of each write operation block, wherein each of the entries is associated with one of the data objects.

6. A method for transferring data, comprising:
when changed data objects at a first system that are not cached in shared cache are transferred to disk, sending a batch cross invalidation command identifying the changed data objects transferred to disk.

7. The method of claim 6, wherein the batch cross invalidation command invalidates the changed data objects at a second system.

8. The method of claim 6, further comprising:
receiving the batch cross invalidation at a shared external storage; and
sending the cross invalidation signals one data object at a time.

9. The method of claim 6, wherein the batch cross invalidation command takes as input a data buffer that includes a list of entries, a start of list index, and an end of list index, wherein each of the entries is associated with one of the data objects.

10. A method for transferring data, comprising:
transferring multiple data objects from a cache structure to a processor storage using a single batch castout command; and
transferring multiple data objects from the processor storage to disk.

11. The method of claim 10, wherein the batch castout command takes as input a list of entries to be read for castout, a start of list index, an end of list index, and an output buffer that contains information read for each entry in the list, wherein each of the entries is associated with one of the data objects.

12. A system for transferring data, comprising:
means for identifying multiple data objects that have been changed by one or more transactions; and
means for using heuristics to determine whether to use a batch write command or several single write commands to transfer the multiple data objects from local storage to a shared cache structure using the batch write command.

13. The system of claim 12, wherein the multiple data objects are identified using a transaction data object list.

14. The system of claim 12, wherein the batch write command is used with a "force at commit" protocol.

15. The system of claim 12, wherein the batch write command takes as input an input data buffer comprising a list of write-operation blocks that describe entries to be written, a list of entry data contents to be written, a start of list index, an end of list index, and a data offset and returns as output a list of write operation response blocks for each write operation block that indicates the outcome of each write operation block, wherein each of the entries is associated with one of the data objects.

16. A system for transferring data, comprising:
means for identifying multiple data objects that have been changed by one or more transactions; and
means for transferring the multiple data objects from local storage to a shared cache structure using a batch write command with a "no force" protocol.

17. A system for transferring data, comprising:
means for, when changed data objects at a first system that are not cached in shared cache are transferred to disk, sending a batch cross invalidation command identifying the changed data objects transferred to disk.

18. The system of claim 17, wherein the batch cross invalidation command invalidates the changed data objects at a second system.

19. The system of claim 17, further comprising:
means for receiving the batch cross invalidation at a shared external storage; and
means for sending the cross invalidation signals one data object at a time.

20. The system of claim 17, wherein the batch cross invalidation command takes as input a data buffer that includes a list of entries, a start of list index, and an end of list index, wherein each of the entries is associated with one of the data objects.

21. A system for transferring data, comprising:
means for transferring multiple data objects from a cache structure to a processor storage using a single batch castout command; and
means for transferring multiple data objects from the processor storage to disk.

22. The system of claim 21, wherein the batch castout command takes as input a list of entries to be read for castout, a start of list index, an end of list index, and an output buffer that contains information read for each entry in the list, wherein each of the entries is associated with one of the data objects.

23. An article of manufacture comprising a computer readable storage medium including code for transferring data, wherein the code is capable of causing operations, the operations comprising:
identifying multiple data objects that have been changed by one or more transactions; and
using heuristics to determine whether to use a batch write command or several single write commands to transfer the multiple data objects from local storage to a shared cache structure using the batch write command.

24. The article of manufacture of claim 23, wherein the multiple data objects are identified using a transaction data object list.

25. The article of manufacture of claim 23, wherein the batch write command is used with a "no force" protocol.

26. An article of manufacture including code for transferring data, wherein the code is capable of causing operations, the operations comprising:
identifying multiple data objects that have been changed by one or more transactions; and
transferring the multiple data objects from local storage to a shared cache structure using a batch write command with a "force at commit" protocol.

27. An article of manufacture comprising a computer readable storage medium including code for transferring data, wherein the code is capable of causing operations, the operations comprising:
identifying multiple data objects that have been changed by one or more transactions; and
transferring the multiple data objects from local storage to a shared cache structure using a batch write command, wherein the batch write command takes as input an input data buffer comprising a list of write-operation blocks that describe entries to be written, a list of entry data contents to be written, a start of list index, an end of list index, and a data offset and returns as output a list of write operation response blocks for each write operation block that indicates the outcome of each write operation block, wherein each of the entries is associated with one of the data objects.

28. An article of manufacture comprising a computer readable storage medium including code for transferring data, wherein the code is capable of causing operations, the operations comprising:

when changed data objects at a first system that are not cached in shared cache are transferred to disk, sending a batch cross invalidation command identifying the changed data objects transferred to disk.

29. The article of manufacture of claim 28, wherein the batch cross invalidation command invalidates the changed data objects at a second system.

30. The article of manufacture of claim 28, the operations further comprising:

receiving the batch cross invalidation at a shared external storage; and sending the cross invalidation signals one data object at a time.

31. The article of manufacture of claim 28, wherein the batch cross invalidation command takes as input a data buffer that includes a list of entries, a start of list index, and an end of list index, wherein each of the entries is associated with one of the data objects.

32. An article of manufacture comprising a computer readable storage medium including code for transferring data, wherein the code is capable of causing operations, the operations comprising:

transferring multiple data objects from a cache structure to a processor storage using a single batch castout command; and transferring multiple data objects from the processor storage to disk.

33. The article of manufacture of claim 32, wherein the batch castout command takes as input a list of entries to be read for castout, a start of list index, an end of list index, and an output buffer that contains information read for each entry in the list, wherein each of the entries is associated with one of the data objects.

* * * * *